March 16, 1965  C. E. FUTCH  3,173,558
BOAT TRAILER AND LAUNCHER
Filed March 22, 1963
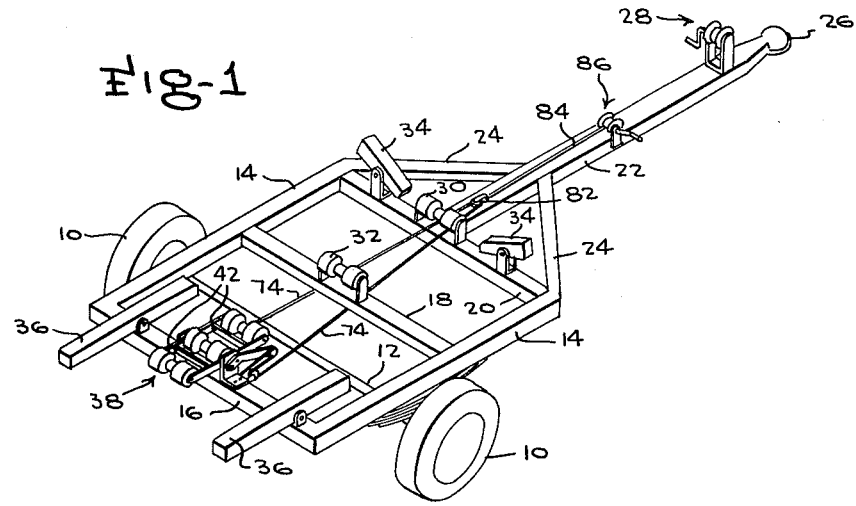
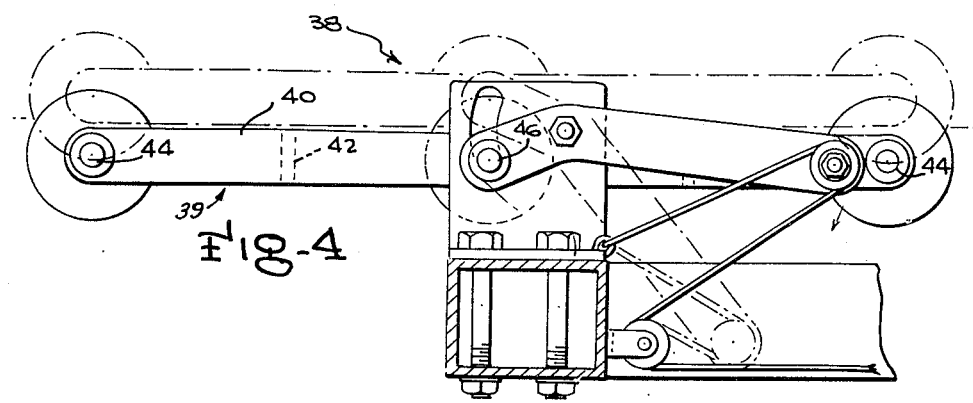
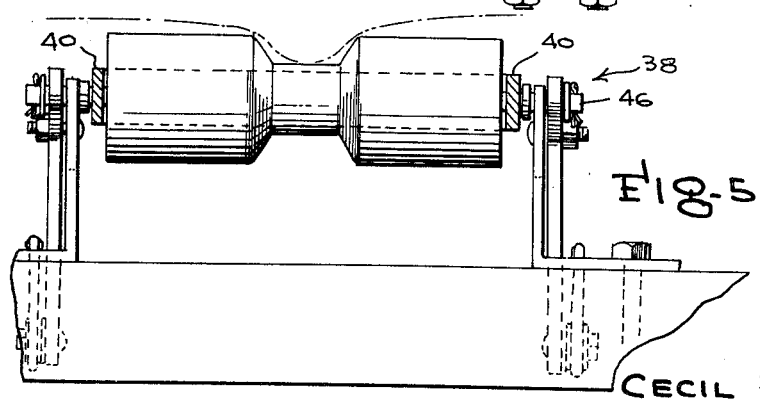
INVENTOR.
CECIL E. FUTCH
BY
McMorrow, Berman & Davidson
ATTORNEYS

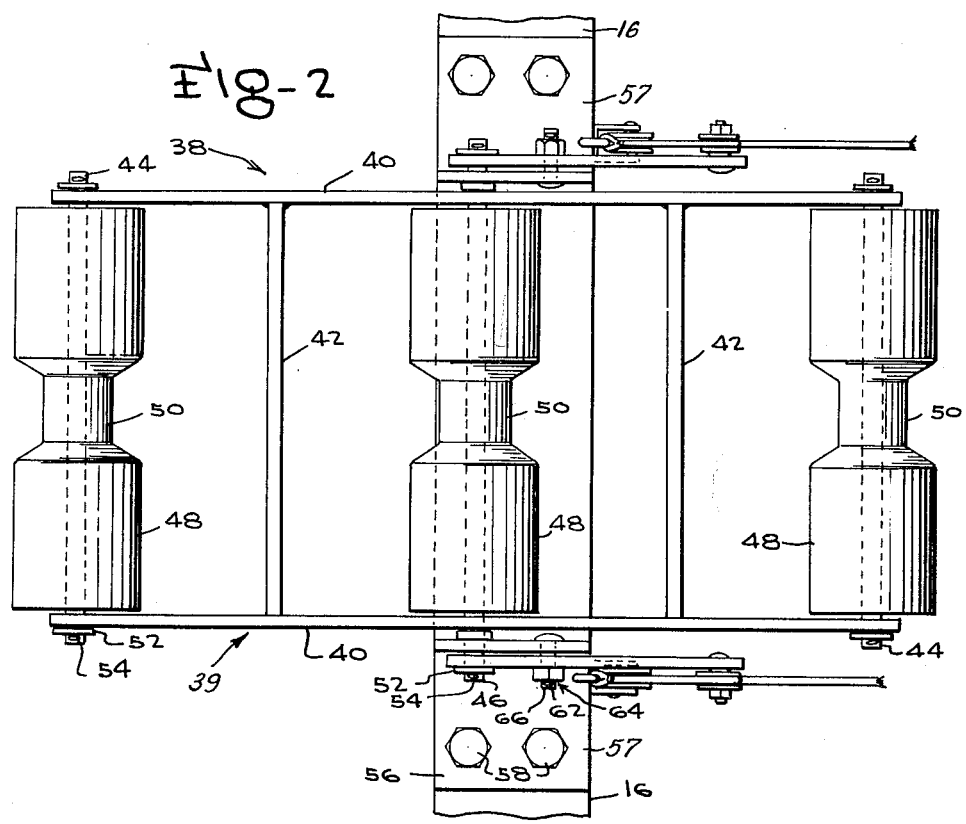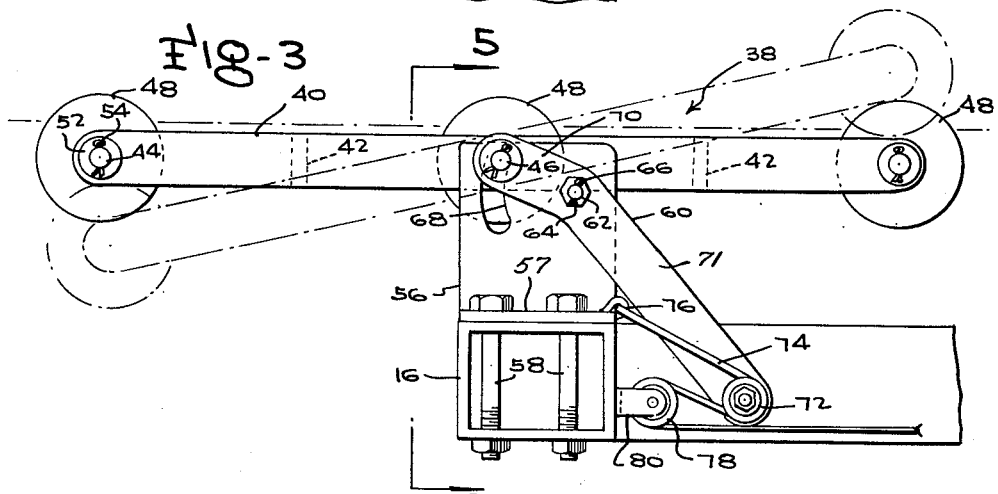

United States Patent Office 3,173,558
Patented Mar. 16, 1965

3,173,558
BOAT TRAILER AND LAUNCHER
Cecil E. Futch, P.O. Box 1664, Savannah, Ga.
Filed Mar. 22, 1963, Ser. No. 267,309
3 Claims. (Cl. 214—84)

This invention relates to a boat trailer having launching means which assists in launching a boat therefrom, and loading a boat therefrom.

An object of the present invention is the provision of roller means, on which a boat is adapted to be rollably supported, above a trailer, in both launching and loading positions, the said means being tiltable, relative to the trailer, on which the said means is mounted, whereby these operations are materially facilitated.

More particularly, it is an object to provide a multiple roller assembly, at the rear end of the trailer, which provides maximum guidance of a boat, free of the trailer, and minimize bearing loads during periods when the entire load of the boat is borne by the multiple roller assembly.

In still greater particular, it is an object to provide for both vertical and angular adjustment of said roller assembly.

The objects also include provision of a device which is low in cost, and ease of manufacture, assembly and maintenance, as well as rugged in service.

These and other objects, which will be apparent, are attained by the present invention, a preferred form of which is described in the following specification, as illustrated in the drawings, in which:

FIGURE 1 is a perspective view of a boat trailer, which included a launcher unit constructed according to the principles of the present invention, FIGURE 2 is an enlarged top plan view of the launching unit, and showing its attachment to a structural member of the trailer, FIGURE 3 is a side elevational view of FIGURE 2, showing the launching unit frame in normal position, in full lines, and in rearwardly tilted launching position, in broken lines;

FIGURE 4 is a view similar to FIGURE 3, showing the launcher in downwardly adjusted boat elevating position, and FIGURE 5 is a transverse vertical sectional view, taken on the line 5—5 of FIGURE 3.

Referring to the drawings by characters of reference there is shown, in FIGURE 1, a boat trailer which is conventional, for the most part, comprising a pair of wheels 10, journalled on a suitable axle 12, supporting a trailer frame of square, tubular construction, including a pair of side rails 14, three cross rails including a rear rail 16, an intermediate rail 18, and a front rail 20, a drawbar 22 extending forwardly from front, cross rail 20, and a pair of forwardly converging bars 24, extending from the ends of rail 20 to an intermediate point along the length of drawbar 22. A socket 26 on the forward end of the drawbar is adapted to cooperate with a suitable ball connector (not shown) on the towing vehicle. A ratchet winch 28, on a forward part of the drawbar, is intended to draw a boat onto the trailer. The pairs of opposed forward and intermediate keel rollers 30, 32, on crossbars 20, 18, respectively, are also conventional, as are the pivoted front boat supports 34 for a boat, and pivoted rear supports 36, for a rear part of a boat.

The illustrated launching unit 38 of the invention, which takes the place of what would ordinarily be a rearmost set of rollers, such as the pairs of rollers 30, 32, is mounted upon rearmost, transverse rail 16. Referring to FIGURES 2 to 5, this unit will be seen to comprise a ladder-like frame 39 having a pair of flat side rails 40, joined together in spaced, parallel relation by a pair of flat, cross members 42, with transverse end shafts 44 extending across the frame and journaled, at their ends, in the side rails 40, at the ends thereof. A longer intermediate shaft 46 is journaled, at its ends, through the side rails 40. Each of the shafts carries a roller 48 of stiff material, which are formed with central annular keel grooves 50, which are conventional and may be identical with those of the rollers 30, 32. The shafts may be conveniently retained by washers 52 and cotter pins 54.

The launcher unit frame is supported on a pair of spaced upstanding brackets 56, having lateral flanges 57, by pairs of bolts 58 to rearmost cross rail 16. The actual support for the launching unit frame 39 comprises a pair of lever arms 60, intermediately journalled on pivot bolts 62, carried in suitable openings in brackets 56, and secured by nuts 64 and cotter pins 66. Rearwardly of the openings for pivot bolts 62, the brackets 56 have arcuate slots 68, concentric with said openings, and which slots receive the ends of intermediate shaft 46, and provide upper and lower limits of swing of the frame 39 the axis of pivot bolts 62. In the interest of mechanical advantage, and also proper clearance of parts in the system, the short arms 70 of the levers 60, which extend rearwardly from the pivot bolts 62, are disposed at an upward and rearward angle to the longer forward arms 71 thereof, which extend at forward and downward angles. It will be seen that the frame 39 may move up and down, as a whole, with respect to the trailer, by virtue of the swing of its intermediate shaft about pivot bolts 62, and that in any position of its swing it may be tilted about the axis of intermediate shaft 46. This tilting is utilized only when the intermediate shaft 46 is in an elevated position in the arcuate slots 68, in which the frame 39 is elevated above the level of the rear trailer boat supports 36. In the depressed position of the frame 39, the entire weight of a boat may be carried by the supports 36, or may be divided between the trailer supports and the launching unit rollers, in any desired ratio. In this position of trailer support, a boat may be transported, without rocking, and without injury to the boat or the rollers. When it is desired to launch the boat, it is merely necessary to bear down on the front ends of levers 60, so as to elevate the launching unit frame 39 (after removal of boat-securing straps, if any) and the boat will either tilt rearwardly automatically, for easy launching, if properly over-balanced on the launcher, or the launching may be initiated with a slight, manual effort. In either case, the boat rolls rearwardly truly and securely on the three rollers of the frame 39 and injury to either the boat or these rollers is minimized. The same situation exists in the reverse process of loading a boat onto the trailer.

Means for depressing the forward ends of the levers 60 is provided by cables and a winch. Each lever 60 carries, at its forward end, a freely journaled pulley 72, around the front side of which is trained a cable 74, the rear end of which is anchored to an eye 76, carried by a related bracket 56. After the pulleys 72, the cables 74 are trained around the rear sides of pulleys 78, journaled in brackets 80, secured to the front side of the cross rail 16 of the trailer. As seen in FIGURE 1, the cables 74 are looped around an equalizing sheave 82, carried by a single forward cable 84, which is wound on a hand winch 86, which may be of smaller capacity than the forward winch 28, and is spaced rearwardly therefrom. Both winches are preferably of the ratchet type. It will be seen that operation of the rear winch 86 will pull the rear cables 74 forwardly so as to depress the levers 60, causing the launching frame 39 to move upwardly in slots 68, from the normal position shown in solid lines in FIGURE 4, to the elevated horizontal position shown in solid lines in FIGURE 3. In the latter figure, the rearwardly tilted position of the launching frame 39 is shown in broken lines.

From the foregoing, it will be seen that there has been provided a construction which achieves the objects sought, in addition to many others, including the possibility of launching a boat without having to immerse the trailer in water.

Generally speaking, while a certain, preferred embodiment has been shown and described, various modifications will be apparent, in the light of this disclosure, and the invention should not, therefore, be deemed as limited, except insofar as shall appear from the spirit and scope of the appended claims.

What is claimed is:

1. In combination, a boat trailer and a launching unit, said trailer comprising a frame having a fixed cradle for the hull of a boat, said unit comprising a pair of brackets, a pair of levers journalled medially of their lengths on the respective brackets on an aligned axis, said brackets having arcuate slots concentric with said axis, a rectangular framework carrying a plurality of parallel shafts, each shaft carrying a boat-supporting roller within said framework, the opposite ends of one of said shafts extending through related ones of said slots, and engaged by the rearward ends of said levers, and means to swing said levers, said means comprising a pulley carried by the rearward end of each of said levers, a pair of pulleys carried by said frame, in cooperative relation to the respective pulleys on the levers, a cable anchored to said frame at its ends, and engaging each of said pair of pulleys, and each of the pulleys on said levers in opposed loops, a winch on said frame having a cable, and a sheave on said latter cable engaged by the first-mentioned cable.

2. In combination, a boat trailer, a launching unit comprising a pair of brackets, a lever arm pivoted medially of its length on each of said brackets, said brackets having arcuate slots concentric with the axis of pivoting of said arms, a rectangular framework, a plurality of boat-supporting rollers carried by said framework, and shaft means on opposite sides of said framework extending through said slots, the ends of said lever arms being journalled on said shaft means, pulley means carried by said lever arms and said trailer, a cable adapted for engagement around said pulleys and anchorage to said trailer, and a winch with a cable having an equalizing shift adapted to engage the first-mentioned cable.

3. In combination, a boat trailer frame having forward and intermediate keel grooved rollers, a winch on the frame forwardly of the forward rollers, a launching unit on the frame behind the intermediate rollers, said unit comprising a pair of laterally spaced upstanding brackets, a launching frame disposed between the brackets, said launching frame carrying longitudinally spaced keel grooved rollers disposed at opposite sides of the location of the brackets, said brackets being formed with vertical arcuate slots, means on the launching frame slidably journaled in said slots, levers pivoted intermediate their ends on the brackets at a location spaced forwardly from the slots, the levers having rear ends pivoted on the said means and depressed forward ends, the forward ends of the levers carrying forward pulleys, rear pulleys on the trailer frame spaced behind the forward pulleys, cable means fixed at the rear end thereof to the trailer frame, and trained around the forward side of the forward pulleys and thence around the rear sides of the rear pulleys, and thence extended forwardly to the winch.

References Cited by the Examiner

UNITED STATES PATENTS

| | | | |
|---|---|---|---|
| 2,000,230 | 5/35 | Heise | 280—43.19 X |
| 2,140,421 | 12/38 | Fageol | 298—15 |
| 2,733,823 | 2/56 | Evans | 214—84 X |
| 2,736,568 | 2/56 | Martin | 280—414 X |
| 3,077,277 | 2/63 | Holzman | 214—84 |
| 3,082,892 | 3/63 | Cox | 214—74 X |

HUGO O. SCHULZ, *Primary Examiner.*

GERALD M. FORLENZA, *Examiner.*